Patented Aug. 10, 1948

2,446,803

UNITED STATES PATENT OFFICE 2,446,803

MANUFACTURE OF HETEROCYCLIC BASES

Franz Bergel, Alexander Lang Morrison, and Heinrich Rinderknecht, Welwyn Garden City, England, assignors, by mesne assignments, to Hoffmann-La Roche Inc., Roche Park, Nutley, N. J., a corporation of New Jersey No Drawing. Application January 15, 1944, Serial No. 518,402. In Great Britain January 26, 1943

4 Claims. (Cl. 260—294)

In British Specification No. 552,065 a process for the preparation of heterocyclic bases is described which comprises condensing an arylacetonitrile derivative with a tertiary halogenoalkylbenzylamine in the presence of an alkaline condensing agent such as sodium or sodamide and subsequent catalytic hydrogenation whereby heterocyclic bases are formed.

According to the present invention an α or β-halogenoalkyl cyanide is condensed with an arylacetonitrile derivative of the general formula:

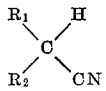

where R₁ is an aryl group which may carry substituents not interfering with the reaction and R₂ is H, an alkyl, an aryl or an esterified carboxyl group, in the presence of an alkaline condensing agent which is capable of forming an alkali-metal derivative of the said arylacetonitrile. Examples of such condensing agents are alkali metals, alkali metal amides and alkali metal alcoholates. The condensation product has the general formula:

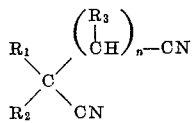

where R₃ is H or an alkyl group and n is one or two. When this condensation product is subjected to catalytic hydrogenation, in the course of which intramolecular condensation with elimination of ammonia takes place, heterocyclic bases are obtained having the general formula:

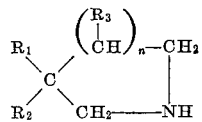

The following examples illustrate how the invention may be carried into effect.

Example I

To 15 parts by weight of ethyl phenylcyanoacetate dissolved in 75 parts by volume of dry toluene, 3.1 parts by weight of powdered sodamide are added in several portions. When all the sodamide has been added, the reaction mixture is gently refluxed with mechanical stirring for half an hour. After cooling, 7 parts by weight of β-chloropropionitrile in 5 parts by volume of toluene are added at once. The mixture is then heated gradually to boiling and kept refluxing for 2 hours with continuous stirring. After cooling it is treated with water. The toluene layer is separated and washed with water. The toluene is then distilled off under reduced pressure and the residue subjected to distillation in high vacuo. The α-phenyl-α-carbethoxy glutaric acid dinitrile comes over at 145° C./0.1 mm. as a viscous colourless oil.

4 parts by weight of activated charcoal suspended in ethyl alcohol are shaken with 10 parts by volume of a 5% palladium chloride solution in a hydrogen atmosphere. When the absorption of hydrogen has ceased, 2.2 parts by weight of the above dinitrile are added and shaking continued until the theoretical amount of hydrogen has been taken up. Owing to poisoning of the catalyst during the hydrogenation, several additions of fresh palladium chloride are necessary. After filtration of the catalyst the alcohol is evaporated under reduced pressure and the residue treated with ice-cold sodium hydroxide solution and ether. The ether extract is washed with water, dried over anhydrous potassium carbonate and evaporated. The residue is distilled in high vacuo. The 3-phenyl-3-carbethoxypiperidine comes over at 106–107° C./0.1 mm. as a mobile colourless oil. It forms a solid nitroso derivative which melts at 88–90° C. after recrystallisation from petrol ether (60–80° C.). The hydrochloride of the 3-phenyl-3-carbethoxy-piperidine is easily soluble in water and is a valuable analgesic.

Example II 12 parts by weight of ethyl phenylcyanoacetate are dissolved in 50 parts by volume of dry toluene. 2.1 parts by weight of sodamide powder are then added in several portions with mechanical stirring. The reaction mixture is now gently refluxed for ¼ hour. After cooling 4 parts by weight of chloro-acetonitrile dissolved in 5 parts by volume of toluene are added at once. The mixture is then refluxed for 2 hours. After cooling the toluene layer is separated and washed with water. The toluene solution is then evaporated under reduced pressure and the residue distilled. The α-phenyl-α-carbethoxy succinic acid dinitrile has a B. Pt. 141–142° C./0.15 mm. and is a colourless oil.

4 parts by weight of activated charcoal suspended in ethyl alcohol are shaken with 6 parts by volume of a 10% aqueous solution of palladium chloride in a hydrogen atmosphere until absorption of hydrogen ceases. 3 parts by weight of the above dinitrile are now added and shaking is continued. When the absorption becomes very slow, another 2 parts by volume of palladium chloride solution is added and shaking resumed until the absorption ceases. The mixture is then filtered and the solvent evaporated under reduced pressure. The residue is treated with ice cold sodium hydroxide solution and ether. The ether extract is washed with water dried over anhydrous sodium sulphate and evaporated. The residue is distilled. The ethyl 3-phenyl-pyrrolidine-3-carboxylate distils at 970 C./0.1 mm. and is a mobile, colourless oil.

We claim:

1. A process for the manufacture of salts of heterocyclic bases of the general formula:

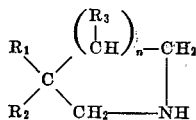

where $R_1$ is aryl, $R_2$ is an esterified carboxyl group, $R_3$ is selected from the group consisting of a hydrogen atom and alkyl groups and $n$ is an integer not greater than 2, which comprises subjecting a compound of the general formula:

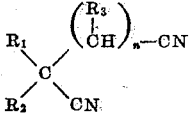

to hydrogenation in the presence of a hydrogenation catalyst.

2. A process for the manufacture of salts of 3-phenyl-3-carbethoxy-piperidine which comprises reacting α-phenyl-α-carbethoxy glutaric acid dinitrile with hydrogen in the presence of a palladium chloride catalyst.

3. A process for the manufacture of salts of ethyl-3-phenyl-pyrrolidine-3-carboxylate which comprises reacting α-phenyl-α-carbethoxy succinic acid dinitrile with hydrogen in the presence of a palladium chloride catalyst.

4. A process according to claim 1 in which the salt is neutralized to convert said salt into its free base form.

FRANZ BERGEL.
ALEXANDER LANG MORRISON.
HEINRICH RINDERKNECHT.

REFERENCES CITED

The following references are of record in the file of this patent:

UNITED STATES PATENTS

| Number | Name | Date |
| --- | --- | --- |
| 1,672,253 | Giles | June 5, 1928 |
| 1,714,180 | McElvain | May 21, 1929 |

Certificate of Correction

August 10, 1948.

Patent No. 2,446,803.

FRANZ BERGEL ET AL.

It is hereby certified that error appears in the printed specification of the above numbered patent requiring correction as follows:

Column 3, line 9, for "970 C." read *97° C.*;

and that the said Letters Patent should be read with this correction therein that the same may conform to the record of the case in the Patent Office.

Signed and sealed this 22nd day of February, A. D. 1949.

[SEAL]

THOMAS F. MURPHY,
*Assistant Commissioner of Patents.*